(12) United States Patent  
Peck

(10) Patent No.: US 7,838,769 B2  
(45) Date of Patent: Nov. 23, 2010

(54) RECESSED ELECTRICAL OUTLET BOX FOR FLOORS

(75) Inventor: David M. Peck, Danbury, CT (US)

(73) Assignee: Hubbell Incorporated, Shelton, CT (US)

( * ) Notice: Subject to any disclaimer, the term of this patent is extended or adjusted under 35 U.S.C. 154(b) by 372 days.

(21) Appl. No.: 11/826,036

(22) Filed: Jul. 11, 2007

(65) Prior Publication Data

US 2009/0014196 A1  Jan. 15, 2009

(51) Int. Cl.  
*H01H 9/02* (2006.01)

(52) U.S. Cl. ...................................... 174/58

(58) Field of Classification Search ............. 174/53–55, 174/58, 60–64; 248/906; 439/535–539; 220/3.2, 3.3, 3.8, 4.02  
See application file for complete search history.

(56) References Cited

U.S. PATENT DOCUMENTS

| 740,663 A | 10/1903 | Krantz |
| 1,483,453 A * | 2/1924 | Knoderer ................... 220/3.94 |
| 1,928,198 A | 9/1933 | Buchanan |
| 2,423,757 A | 7/1947 | Dedge |
| 2,816,682 A * | 12/1957 | Brucker ................. 220/203.12 |
| 2,886,630 A | 5/1959 | Gill |
| 3,834,658 A | 9/1974 | Theodorides |
| 3,952,142 A * | 4/1976 | Weiss ......................... 174/562 |
| 4,634,015 A | 1/1987 | Taylor |
| 5,012,043 A | 4/1991 | Seymour |
| 5,042,673 A | 8/1991 | McShane |
| 5,289,934 A | 3/1994 | Smith et al. |
| 5,553,787 A * | 9/1996 | Guginsky ................... 439/472 |
| 6,827,602 B2 * | 12/2004 | Greene et al. ............... 439/490 |
| 6,878,877 B1 | 4/2005 | Cozzi et al. |

* cited by examiner

*Primary Examiner*—Dhiru R Patel  
(74) *Attorney, Agent, or Firm*—Kevin M. Barner; Mark S. Bicks; Alfred N. Goodman

(57) ABSTRACT

An outlet box assembly for installation within a wood, tile or carpeted floor, or any other type of flooring, includes a housing for accommodating an electrical power and/or data receptacle as well as the wiring connected to the receptacle and an adjustment mechanism attached to an outer surface of the housing for adjusting the receptacle downwardly to a recessed position a predetermined distance below the flooring material. The adjustment mechanism further includes an attachment mechanism for attaching the outlet box assembly to either the top or side surface of the floor. A cover plate is provided with a tapered recessed box and an access door for easy access to the recessed receptacle.

29 Claims, 9 Drawing Sheets

RECESSED ELECTRICAL OUTLET BOX FOR FLOORS

FIELD OF THE INVENTION

The present invention relates generally to a recessed electrical outlet assembly and more particularly to a recessed electrical outlet assembly installable in a floor and including a height-adjustable mounting mechanism and a tethered sealable contaminant device. The invention also relates to a recessed electrical outlet box assembly that can be mounted directly to the floor material adjacent to an aperture in the floor or mounted directly to floor structural elements beneath the flooring material.

BACKGROUND OF THE INVENTION

Electrical outlet boxes for placement within a wall or a floor are well known in the industry for providing convenient access to power. Typical outlet boxes are placed directly behind the wall or beneath the floor and are configured to receive an electrical receptacle. For example, FIG. 7 illustrates one such known outlet box for installation underneath a floor. Bracket 50 can be attached to the side of an existing floor joist. Outlet box 40 is attached to the side of bracket 50. During installation, the top of box 40 is aligned with the top edge of the flooring material. Screws (not shown) are then used to secure cover plate 10 and receptacle 30, with two separate receptacle outlets 31a and 31b, to the box 40. Caps 20 cover the holes in cover plate 10 when the respective receptacle outlets 31a and 31b are not in use. Upon installation of the outlet box 40 with receptacle 30 and cover plate 10 attached thereto, the receptacle outlets 31a and 31b are flush with the top of the flooring material.

Outlet boxes such as the one illustrated in FIG. 7 are problematic for several reasons. For example, in use, plugs from appliances that are plugged into the respective receptacle outlets 31a and 31b are located above the plane of the floor material. This is a problem because the plugs, being exposed, can be kicked by passers-by, knocked loose by furniture, or otherwise damaged. Additionally, an outlet box as shown in FIG. 7 is usable with flooring material of a fixed height. That is, if the flooring material at a particular installation site were extraordinarily thick, the receptacle within the outlet box would be too far below the floor surface to be easily reached. A further problem with the conventional outlet box shown in FIG. 7 is that the caps 20 swing in a single direction, i.e., outward and above the floor surface. Accordingly, when a cap 20 is opened to gain access to the respective receptacle outlet, the cap is exposed and lies on the floor surface creating a further obstacle to people, furniture and other objects.

U.S. Pat. No. 6,530,806 to Nelson discloses an electrical outlet fixture that can be selectively recessed within the floor material or positioned flush with the floor. As disclosed in the '806 patent, when the outlet fixture is not in use, the outlet is positioned flush with the floor in order to provide an aesthetically pleasing appearance as opposed to leaving a cavity in the floor. To selectively maintain the receptacle flush with the floor or wall surface and also to recess the receptacle within the floor or wall, the outlet fixture disclosed in the '806 patent includes several parts and is, thus, complicated to manufacture.

A number of other outlet fixtures have been proposed which provide an adjustment means for adjusting the height of the outlet fixture relative to the installation surface, e.g., wall or floor. For example, U.S. Pat. No. 6,878,877 to Cozzi et al. discloses an adjustable outlet box assembly that utilizes a telescoping adapter 14 that inserts within the outlet box 10. The outlet box 10 is attached to floor material using a pair of flanges that attach to the underside of the flooring surface. The telescoping insert box 30 is then inserted within the outlet box 10 and attached to the top surface of the floor material using a second set of flanges. A receptacle is then attached to the insert box flush with the top of the floor surface and a cover is placed over the receptacle. The structure of other proposed devices, such as those disclosed in U.S. Pat. No. 4,634,015 to Taylor; U.S. Pat. No. 5,012,043 to Seymour and U.S. Pat. No. 5,042,673 to McShane are similarly complicated and include many individual parts.

There remains a need, therefore, for an electrical outlet box that addresses the aforesaid problems attendant with conventional and other known outlet box fixtures and also is easily manufactured and installed.

SUMMARY OF THE INVENTION

The present invention is directed to an adjustable recessed electrical outlet assembly that is easy to manufacture and install and is sealed from contaminants when an electrical receptacle installed within the housing is not in use.

One aspect of the invention is to provide an electrical outlet box assembly with a height adjustment mechanism for locating the electrical outlet box and, thus, any receptacle installed therein, at a desired distance below the surface of a floor into which the box assembly is installed.

Another aspect of the invention is to provide an electrical outlet box assembly with a recessed box that creates a channel from the top of the housing of the assembly to the floor surface into which the assembly is installed.

Another aspect of the invention is to provide a cover plate that covers the outlet box assembly and protects the receptacle from contamination when not in use as well as from physical damage from people or other objects.

A still further aspect of the invention is to provide an outlet box cover plate with a tethered sealable contaminant device that seals openings in a door cover in the plate when a respective receptacle is not in use and which is stored below the cover plate when the receptacle is in use or otherwise exposed.

Various aspects of the invention are basically attained by providing, in one embodiment, an outlet box assembly is provided that comprises a housing configured with at least two opposing side portions, two opposing end portions and a base portion. Also included in this embodiment are at least one adjustment plate that is in slideable relation with a respective side or end portion of the housing and at least one adjustment device mechanically attached to the housing and a respective adjustment plate, wherein the respective adjustment plate moves relative to the housing when the at least one adjustment device is actuated.

Further aspects of the invention are attained by providing an outlet box assembly with a tapered recessed box with a narrow opening at one end adjacent to an opening in the housing of the outlet box and a wide opening at an opposing end, wherein the wide opening is larger than the narrow opening in at least one dimension and a cover plate is also provided that is mechanically attached to the tapered recessed box and includes an aperture corresponding to the wide opening in the tapered recessed box.

Still further aspects of the invention are attained by providing an outlet box assembly with a cover plate that has a door with at least one opening for providing access to an electrical receptacle and the at least one opening has a sealing gasket that is easily installed and removed from the opening and, when installed to cover the opening is flush with the top surface of the door and when removed to expose the opening remains tethered to the underside of the door.

Still further aspects of the invention are attained by providing an outlet box assembly that is compatible with a multi-purpose receptacle, such as the Trademark JLOAD receptacle manufactured by Hubbell, Incorporated, where the box provides means for conveniently attaching to the receptacle as well as means for separating the interior of the box into separate voltage areas to minimize electrical interference between the various areas within the box.

Still further aspects of the invention are attained by providing an outlet box assembly comprising a housing for accommodating an electrical receptacle, wherein the housing comprises two opposing end portions and at least two respective attachment tabs corresponding to and integral with the end portions, wherein the attachment tabs each comprise mounting holes operable to accommodate corresponding mounting holes in the electrical receptacle and wherein further, each of the end portions of the housing comprise a notch for accommodating a respective structural component of the electrical receptacle.

Still further aspects of the invention are attained by providing an outlet box cover assembly for covering an electrical outlet box, the assembly comprising a tapered recessed box with a narrow opening at one end and a wide opening at an opposing end, wherein the wide opening is larger than the narrow opening in at least one dimension and a cover plate mechanically attached to the tapered recessed box and including an aperture corresponding to the wide opening in the tapered recessed box.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF EXEMPLARY EMBODIMENTS

Exemplary embodiments of the present invention are discussed in detail below. While specific configurations are discussed, it should be understood that this is done for illustration purposes only. A person skilled in the relevant art will recognize that other components and configurations may be used without departing from the spirit and scope of the invention.

The present invention is directed to a recessed electrical outlet box assembly that can be mounted directly to the top surface of flooring material or to some other support within the structure of a floor, such as a floor joist.

The present invention, in one exemplary embodiment, is an integrated housing, adjustment mechanism and attachment means. As described in detail below, a device in accordance with this exemplary embodiment can be adjustably mounted, via attachment means on either side of the housing, to the top or bottom side of flooring material, such as hardwood flooring material, underlayment and other known flooring products. Various knockouts in the housing provide for easy access to wiring to be attached to a receptacle that attaches to the top side of housing. Adjustment mechanisms on either side of the housing permit the height of the housing and, thus, the receptacle, to be selectively placed at a desired height relative to the flooring material.

Figure 1A:
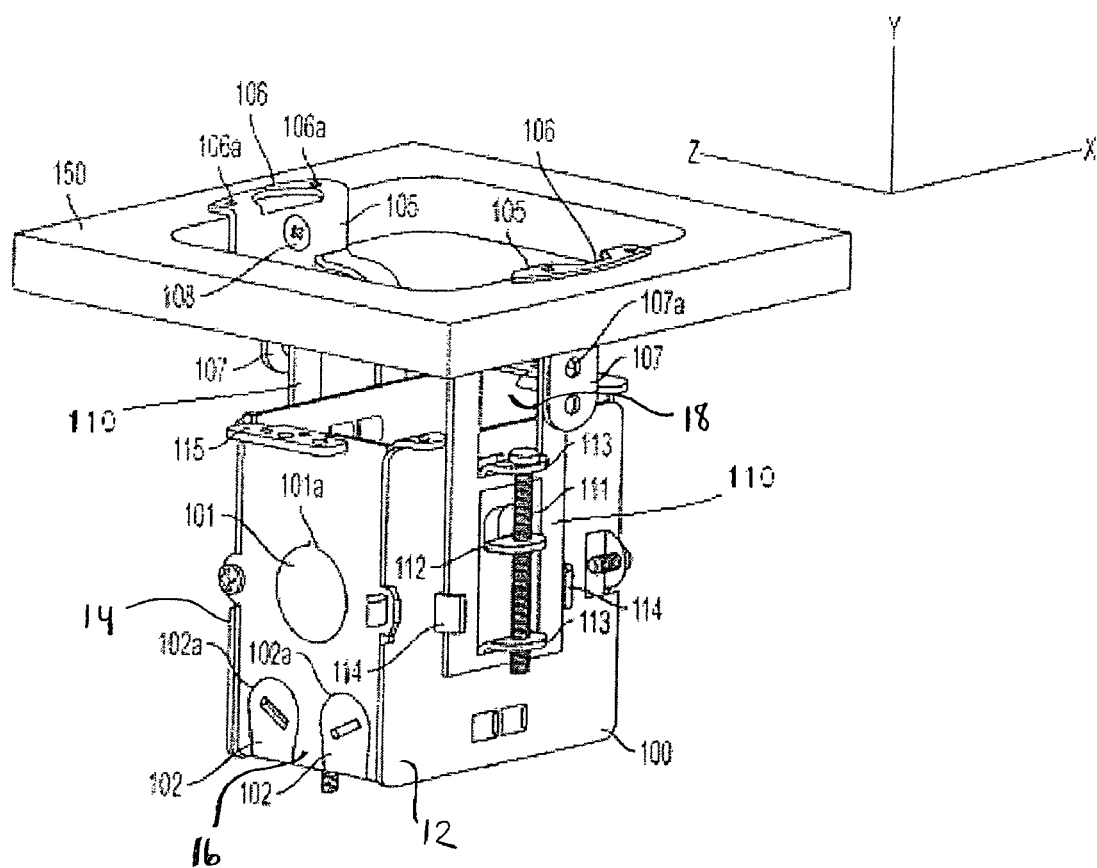
FIG. 1A is a perspective view of the outlet box assembly according to one embodiment of the invention showing an adjustment mechanism for adjusting the height of the outlet box relative to an installation surface.
Figure 3:
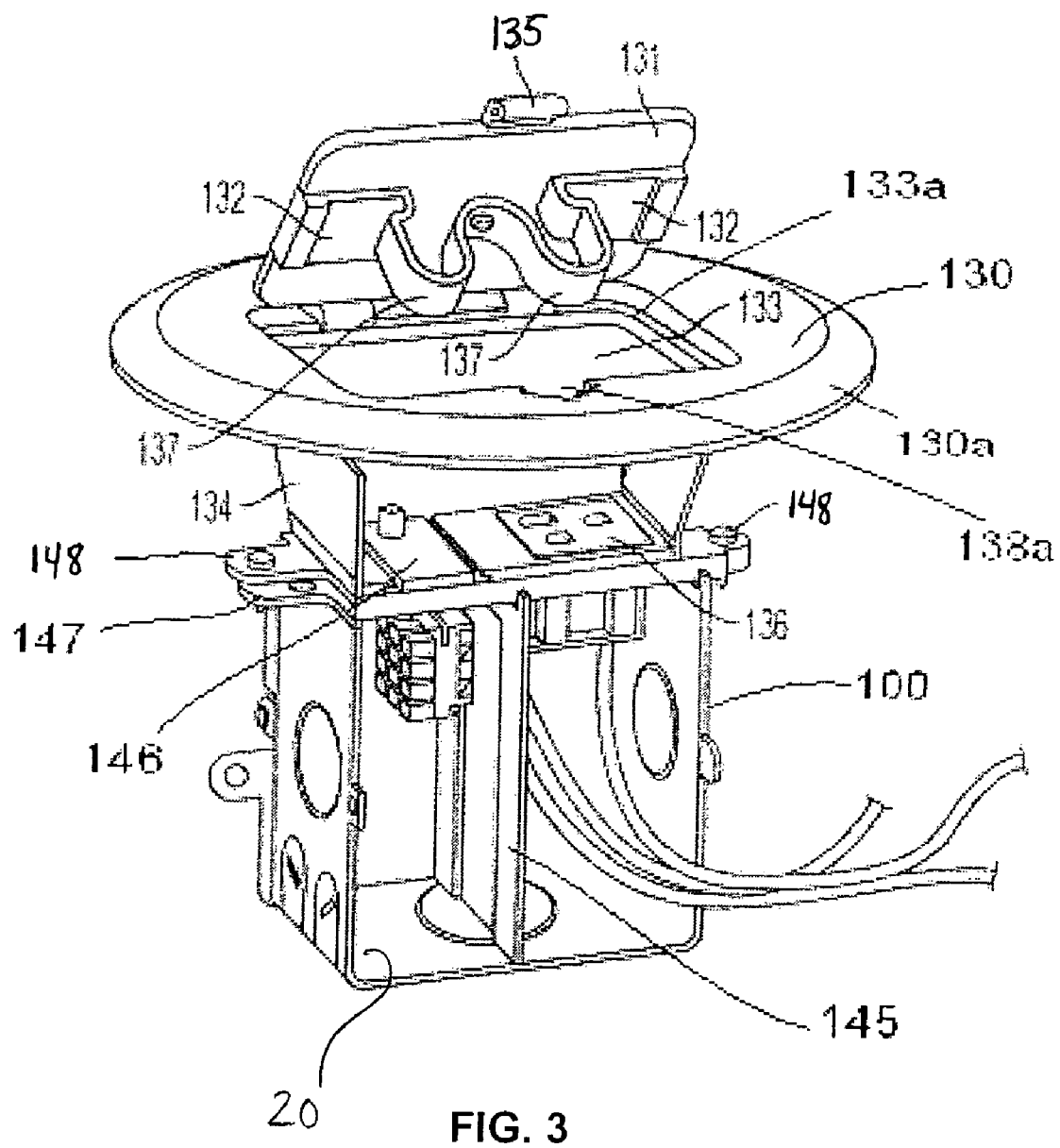
FIG. 3 is a perspective view of the outlet box assembly according to a further embodiment showing a cover plate with an access door further having tethered sealing gaskets covering a recessed box above the outlet box.
Figure 3A:
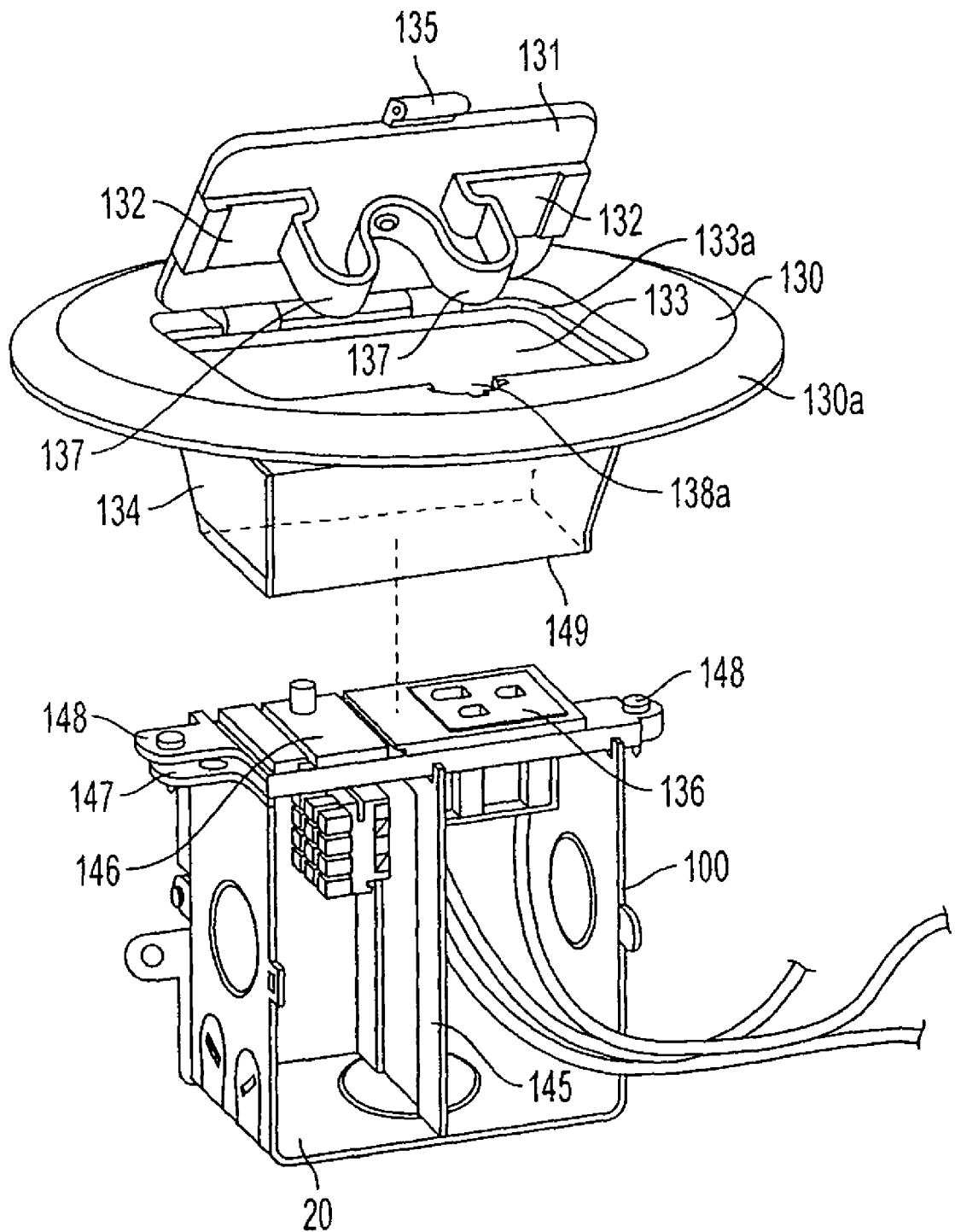
FIG. 3a is an exploded, perspective view of the outlet box showing further detail of the tapered recessed box of the box assembly of FIG. 3.

FIG. 1A is a detailed illustration of one exemplary embodiment of an electrical outlet box in accordance with the present invention. The outlet box 100 is attached to flooring material 150 via attachment devices 105 on either side of box 100. Referring to FIG 1A and 3, box 100 is configured with two opposing side portions 12, 14 two opposing end portions 16, 18, and a base portion 20. Each attachment device 105 includes top flanges 106 as well as side flanges 107. Top flanges 106 rest on top of the flooring material 150, as shown in FIG. 1A. Depending on the thickness of the flooring material 150, the attachment devices 105 are secured to the flooring material 150 via attachment holes 106a in the top flanges 106 and/or via attachment holes 107a in side flanges 107. For example, if the flooring material 150 is relatively thick, attachment screws, such as screw 108 in FIG. 1A, can be used to secure the attachment devices to the flooring material 150 at the side of the aperture 109 cut within flooring material 150.

Alternatively, if the flooring material is relatively thin, such as plywood, the attachment devices can be secured to the flooring material 150 via screws through holes 106a in top flanges 106. Additionally, depending on the placement of the outlet box 100 within the floor space, box 100 can be attached to other structural components, such as floor joists (not shown). For example, top flange 106 can rest on the top side of a floor joist and the attachment device 105 can be secured to the side of the joist via a screw driven through holes 107a in side flanges 107. Accordingly, the outlet box 100 can be attached to the flooring material 150, as illustrated in FIG. 1A, or it can be attached to other support structures, such as floor joists.

Figure 1B:
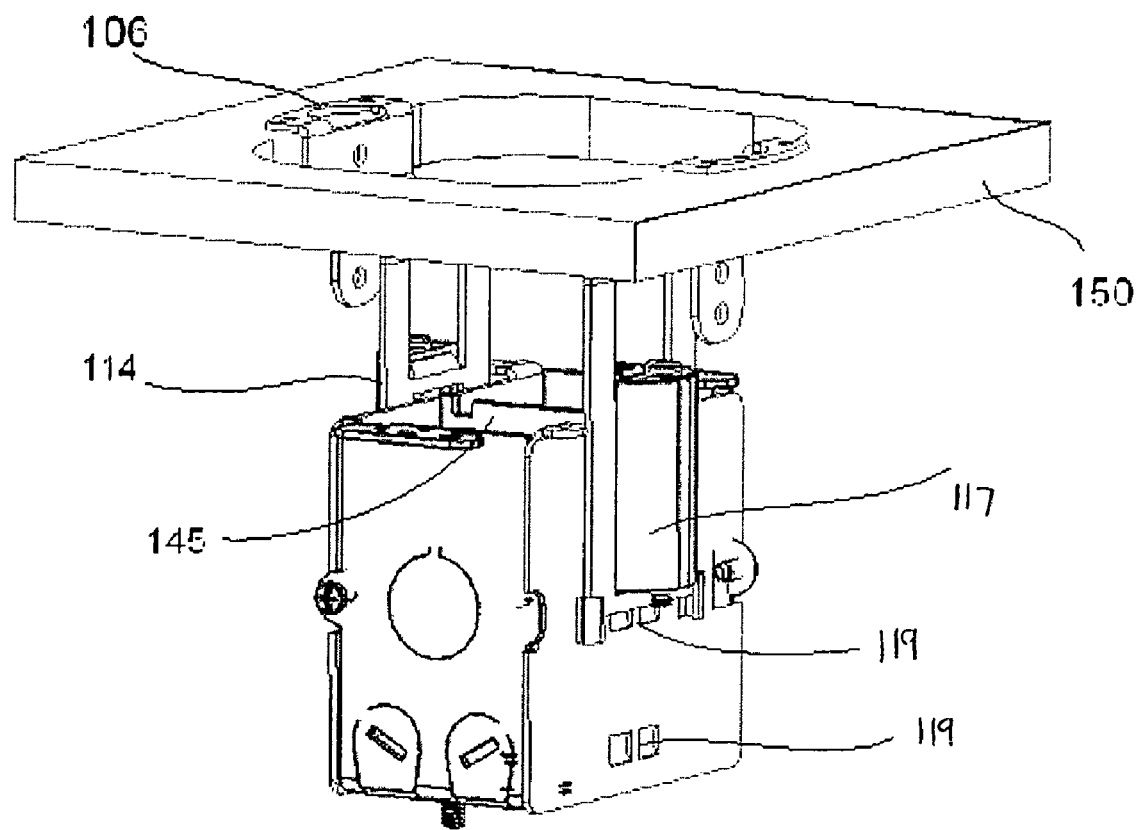
FIG. 1B is a further perspective view of the outlet box assembly of FIG. 1A showing a shroud device in accordance with a further exemplary embodiment of the invention.

Adjustment mechanisms 110 allow the box 100 to be installed within the floor at any desired height relative to the flooring material 150. For example, according to one exemplary embodiment, adjustment mechanisms 110 are adjusted to maintain the box 100 approximately 1.5 inches below the floor material 150. As shown in the embodiment of FIG. 1A, the length of adjustment screw 111 determines how far below the flooring material 150 the box 100 is located. More particularly, according to the embodiment shown in FIG. 1A, a threaded adjustment flange 112 is provided as shown and is integral with the side of the housing of box 100. Additionally, two retainer flanges 113 are provided as shown and are integral with adjustment mechanism 110. As illustrated in FIG. 1B, in accordance with a further embodiment of the invention, a cover, or shroud device 114 covers adjustment screws 111 and flanges 112 and 113. Cover devices 114 can be made of any material and of any shape. However, according to the embodiment shown in FIG. 1B, cover devices 114 are made of a non-conductive plastic material and are semi-circular in shape, providing a very tight fit around the flanges 112 and 113. Furthermore, according to certain embodiments, a hole is created in the surface of outlet box 100 when flanges 112 are created. For example, a cut is made in the surface of the outlet box and the material is forced outward of the box creating the flange. Cover devices 114 also cover the hole created in this manner, thus blocking the hole and selectively preventing access through the surface of the box to the inside space, where 'hot' electrical wires may be present.

Adjustment screw 111 is rotated, or turned, to adjust the relative height of box 100. As the screw 111 is rotated, the screw remains fixed relative to retainer flanges 113 because the holes in retainer flanges are not threaded. Further, because the holes in adjustment flanges 112 are threaded and also because adjustment mechanism 110 is in a slideable relationship with the side of box 100, as the screw 111 is turned the box 100 raises or lowers relative to the number of turns of screw 111. As shown in FIG. 1A, an adjustment device such as adjustment screw 111 is rotated, box 100 moves up or down, i.e., in the "Y" direction, depending on which direction the screw 111 is rotated. Further, because there are two adjustment mechanisms 110 as well as respective adjustment and retainer flanges 112 and 113, and adjustment screws 111, on either side of box 100, the relative tilt of box 100 in the "Z" direction can be adjusted based on the relative turns of the two respective adjustment screws 111. The relative tilt of box 100 in the "X" direction is maintained constant by retainer clips 117 which hold the respective sides of each of the adjustment mechanisms 110.

Also, depending on how and when the box 100 is installed, flanges 106 and 107 are attached to different structures. For example, if the box is installed in an existing floor, e.g., where a hole is cut in the floor material, such as carpet overlying plywood, top flanges 106 would rest on top of the carpet, or possibly just under the carpet, directly adjacent to the hole. Alternatively, if the box is installed in new construction, e.g., before the flooring material is installed, the top flanges 106 can be attached to the top of a floor joist and/or aide flanges 107 can be attached to the side of the joist. In this scenario, the flooring material, such as plywood, hardwood flooring, etc., would then be installed over the top of flanges 106. Accordingly, the outlet box 100 in accordance with this invention is very versatile and can be installed in new or old construction and still maintain its adjustability with respect to the height of the recessed receptacle.

Further, in accordance with this embodiment, housing body or outlet box 100 includes various knockouts 101 and 102 for providing access to wiring (not shown). Although not seen in FIG. 1A, similar knockouts to 101 and 102 are also provided on the opposite side of the outlet box 100. Each knockout includes a portion of the wall of the housing that is substantially severed except for a relatively small tab portion 101a and 102a which acts as an attachment mechanism between the knockout portion of the housing and the remainder of the housing body. The knockout portion is forced away from the outlet box 100 using a tool, such as screwdriver or other such rigid tool and bent either outward from the outlet box 100 or inward. For example, the tip of a flathead screwdriver is placed within slot 102b and the knockout portion 102 is pried away from the outlet box 100 providing an access hole in the housing for inserting the wiring.

In accordance with an outlet box consistent with this embodiment, a receptacle, not shown in FIG. 1A for purposes of clarity, is attached to box 100, for example, using attachment flanges 115. First, wiring (not shown) is drawn through the opened knockout holes and drawn up through the top of box 100 and through the aperture in the flooring material 150. The wiring is then secured to the receptacle (136 in FIG. 3) using well-known techniques consistent with standard electrical procedures. The receptacle is then secured to box 100. Specifically, attachment screws are inserted through holes in flanges in the receptacle body and further inserted through the illustrated respective holes in the attachment flanges 115 of box 100.

Figure 2:
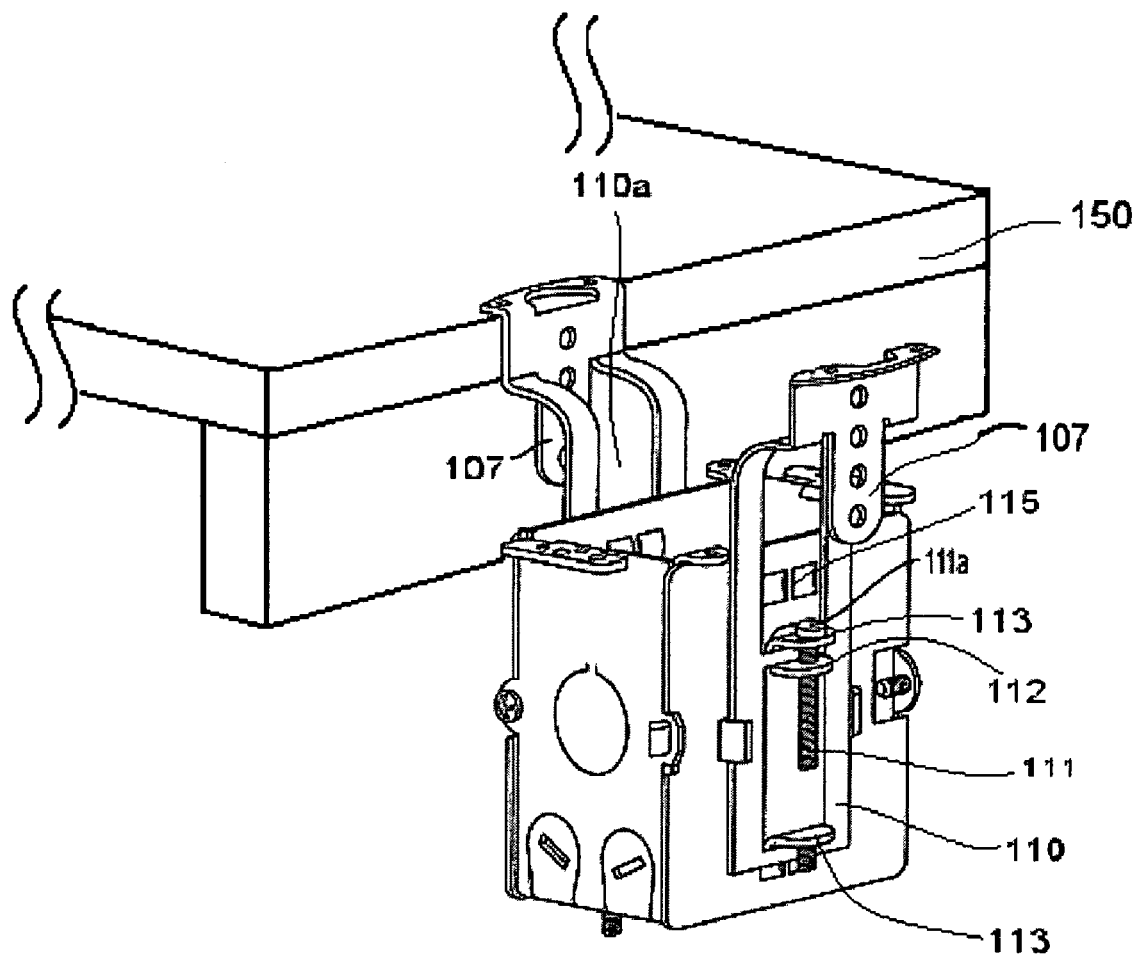
FIG. 2 is a further perspective view of the outlet box assembly according to the first embodiments of FIGS. 1A and 1B showing specific details of the adjustment mechanism.

Thus, according to the embodiment illustrated in FIG. 1A, a height adjustable electrical outlet box is provided that can be secured within an aperture made in various flooring materials and having varying respective thicknesses. Although not shown in FIG. 1A, the adjustment screws 111 can easily be accessed, i.e, for adjustment rotation, from the top side of flooring material 150. That is, as seen more clearly in FIG. 2, adjustment mechanism 110 is constructed with, for example, openings 110a, to permit access from above to the screw head 111a of adjustment screw 111. Accordingly, even in a situation where the outlet box 100 according to the embodiment of FIG. 1A is installed in a floor after the flooring material has been permanently placed, the outlet box according to this embodiment can be installed and height-adjusted subsequent to the installation of the floor. After the box is secured to the flooring material 150 or other structure, as described above, the adjustment mechanisms are adjusted from the top of the floor.

The present invention as described above with respect to the embodiment of FIG. 1A further includes an optional cover plate that can be conveniently used in conjunction with the outlet box described above with respect to FIGS. 1 and 2. FIG. 3 illustrates a cover plate in accordance with the present invention which can easily be used in connection with the outlet box shown in FIGS. 1 and 2.

More particularly, as shown in FIG. 3, a cover plate for the outlet box according to the present invention includes a top plate 130 with an aperture 133 provided in the center thereof. Hinged door 131 covers the entire opening of aperture 133 when the door is in a closed position and provides easy access through aperture 133 when the door is in an open position.

Plate 130 can be made of various materials such as wood, metal or plastic and can be any convenient or aesthetically pleasing shape. For example, the plate 130 shown in FIG. 1A is made of wood and is circular. The edge 130a of plate 130 is tapered to prevent tripping and to provide for objects to slide over the top of the cover plate structure with undue resistance or obstruction.

Attached to the bottom of plate 130 is a recessed box 134. Recessed box 134 can be of varying heights. However, in accordance with the illustrated embodiment of FIG. 3 and in order to provide convenient access to the receptacles 136, the height of recessed box 134 is approximately the same as the distance between the top of box 100 (FIG. 1A), that is where attachment flanges 115 are located, and top flanges 106 (FIG. 1A). According to this exemplary embodiment, aperture 133 in the face of plate 130 is sized to be slightly larger than the opening in the top of box 100 (FIG. 1A). Accordingly, recessed box 134 has tapered sidewalls to transition from the dimension of the face of the receptacle 136 up to the aperture 133 in plate 130 such that the recessed box 134 includes a narrow opening 149 adjacent the receptacle 136 and adjacent a first end of the tapered sidewalls and a wide opening 133 adjacent the second end of the tapered sidewalls.

When hinged door 131 is in the open position, as shown in FIG. 3, easy access is provided to the receptacles 136 located at the lower side of recessed box 134. In this manner, when an appliance is plugged into the receptacles 136, the plug of the appliance is recessed below the surface of the floor.

Tethered gaskets 132 are attached to the underside of hinged door 131 and provide a convenient mechanism by which access holes in the surface of door 131 are covered and sealed when a plug is not plugged into a receptacle 136. More particularly, after a plug is inserted into one or more receptacles 136, the gasket 132 covering the hole in the door corresponding to the respective used receptacle 136 can be removed allowing the cord attached to the plug to conveniently pass through the door 131. Further, as shown in FIG. 3, gaskets 132 are tethered to the underside of door 131 via respective tethering straps 137 so when they are removed from their respective hole, they are out of the way and stored within recessed box 134.

According to at least one embodiment, tethering straps 137 are integral with gaskets 132. The material used to make gaskets 132 can be any material that enables the gaskets to easily slide from its respective hole in door 131. However, according to the illustrated embodiment of FIG. 3, the gaskets 132 as well as tethering straps 137 are made of a flexible rubber or neoprene material which provides an ideal sealing quality to the door holes when the gaskets are in place. In this manner, water, dirt and other contaminants are prevented from entering the holes in door 131 when the door 131 is closed. To provide additional protection from contaminants, an optional gasket 133a is placed around the perimeter of the aperture 133 in plate 130.

Figure 4:
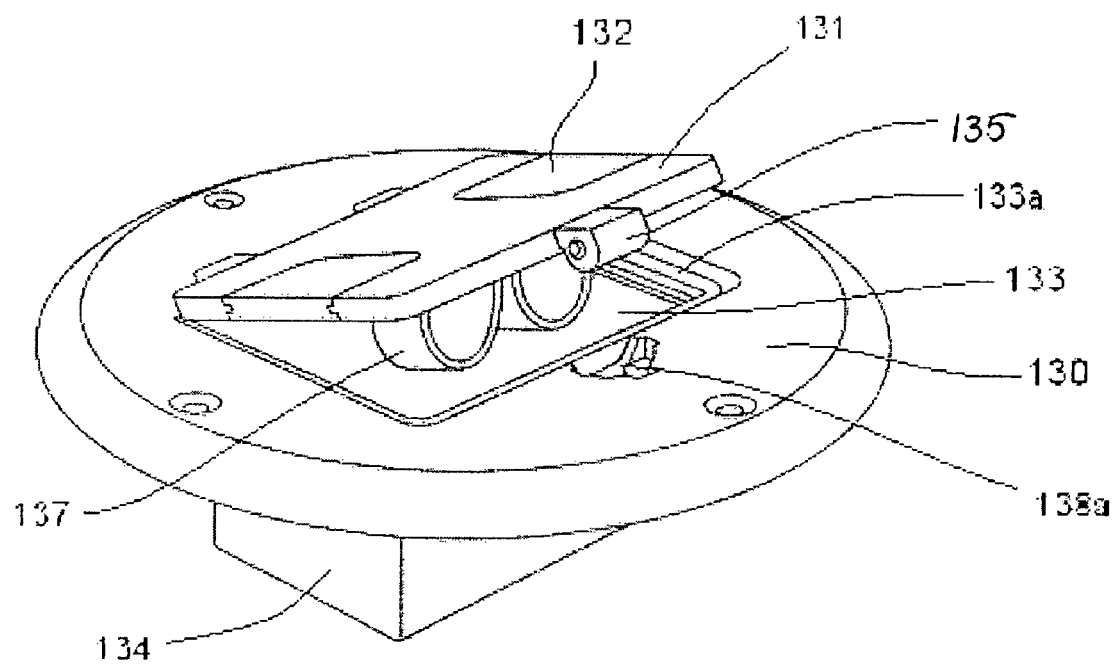
FIG. 4 is a further perspective view showing further detail of the cover plate and door assembly of the box assembly of FIG. 3.

As shown in FIGS. 3 and 4, a ledge exists around the perimeter of the aperture 133 for accommodating the optional gasket 133a. Also, when the door 131 is in a closed position, i.e., covering aperture 133, the perimeter of door 131 presses against the door gasket 133a to complete the seal. Latch 135 on door 131 attaches to a corresponding receiving portion 138a in plate 130 when the door 131 is closed and is easily released when it is desired to open the door 131.

FIG. 3 also shows a further embodiment of the present invention. More particularly, voltage divider 145 is optionally inserted into box 100 to separate the interior space of box 100 into two different areas. In accordance with the embodiment shown, divider 145 is placed between guides 115 (FIG. 1B) which are located on both sides of box 100. For instance, divider 145 separates the interior of box 100 when a Trademark JLOAD receptacle is used. A Trademark JLOAD receptacle is a multimedia outlet, which provides connections for power, Category-5 (Cat-5) and coaxial in a single box. As shown, the interior of box 100 is divided into two different voltage sides, one side for the electrical power receptacle 136 and the other side for a low voltage receptacle 146, such as Category-5, cable television, etc. Receptacles such as the Trademark JLOAD receptacle shown in FIG. 3 have unique flanges that may not align or otherwise be compatible with conventional outlet boxes. Accordingly, in accordance with the embodiment shown, box 100 has special mating flanges 147 which include compatible attachment mechanisms, such as tapped holes for mounting screws 148, which provide for easy mating of the Trademark JLOAD receptacle with the outlet box.

Figure 5:
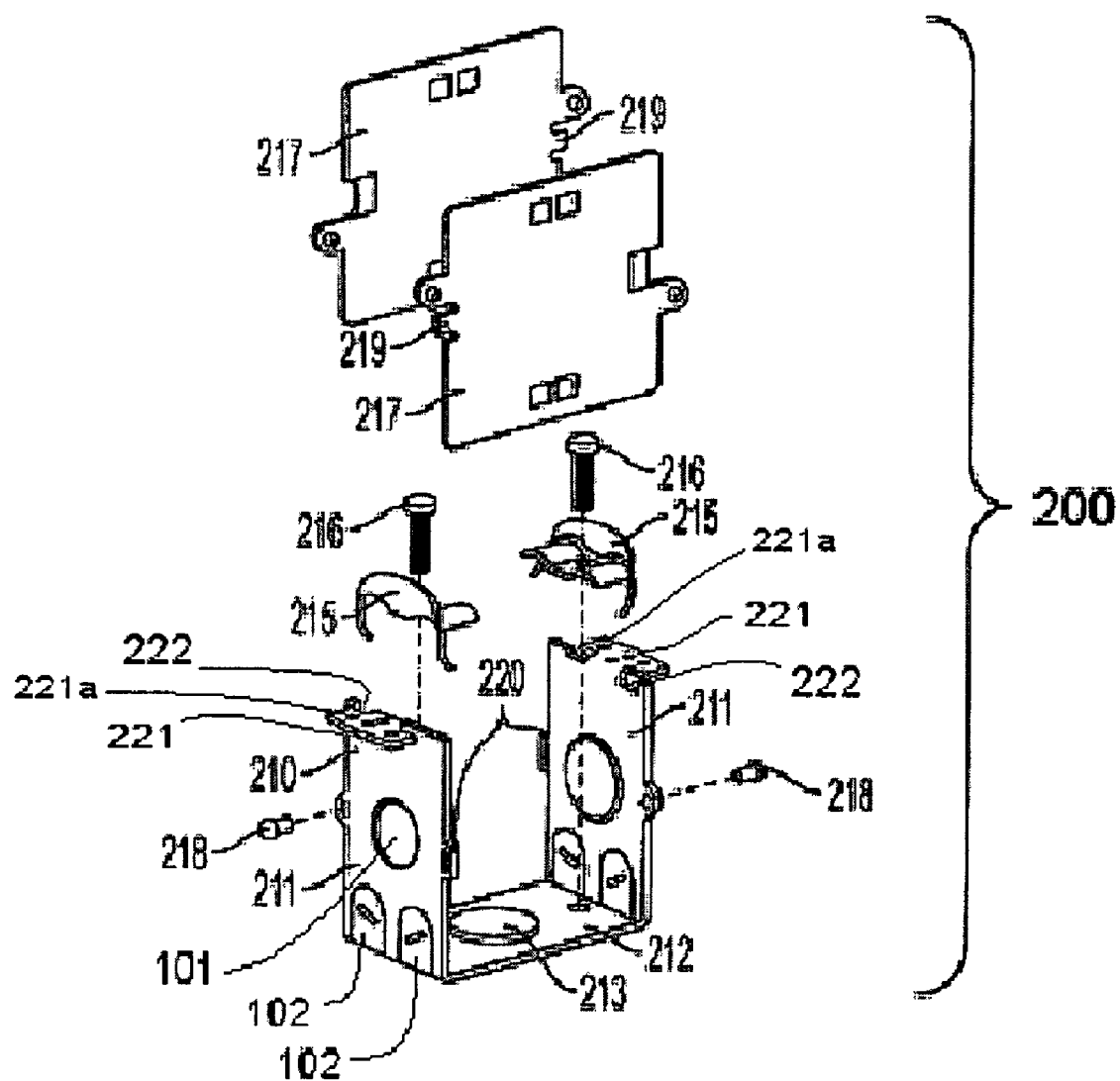
FIG. 5 is an exploded view of the outlet box assembly according to a further embodiment of the invention showing details of the assembly of the box and details of features contained within the box.

FIG. 5 illustrates an exemplary embodiment of the assembly of an outlet box in accordance with the present invention. Specifically, box assembly 200 comprises a U-shaped base portion 210 that includes two similar end portions 211 on either end of the box 200 integrally formed with a bottom portion 212. Knockouts 101 and 102, such as those described in accordance with the embodiments above, are located in the end portions 211 and a bottom knockout 213 is provided in the bottom portion 212. Retainer portions 215 are provided for retaining the wiring or other cables within box 200 after they are inserted through the open knockouts. As shown, retainer portions 215 are secured to the bottom portion 212 by respective screws 216. Side portions 217 are respectively provided on either side of box 200. Side portions 217 are secured to the U-shaped base portion 210 via retainer screws 218 through holes in corresponding tabs located in the end portions 211. Also, tabs 219 on opposing ends of side portions 217 are inserted into corresponding slots 220 in end portions 211.

According to a further embodiment of the invention, also illustrated in FIG. 5, an outlet box assembly is provided which includes tabs 221 with cutouts 222 provided adjacent thereto. As shown, for example in FIG. 5, tabs 221 are provided with a hole pattern for accommodating a Trademark JLOAD receptacle. In particular, tabs 221 include tapped holes 221a in a position that correspond to retainer holes in corresponding tabs in a Trademark JLOAD receptacle (not shown). Further, notches, or cutouts, 222 are provided in end portions 211 of the outlet box assembly, adjacent to tabs 221. Cutouts 222 permit corresponding structure in the Trademark JLOAD receptacle to rest in the cutouts allowing a snug fit between the Trademark JLOAD receptacle and the outlet box when the receptacle is attached to the box using holes 221a.

Figure 6:
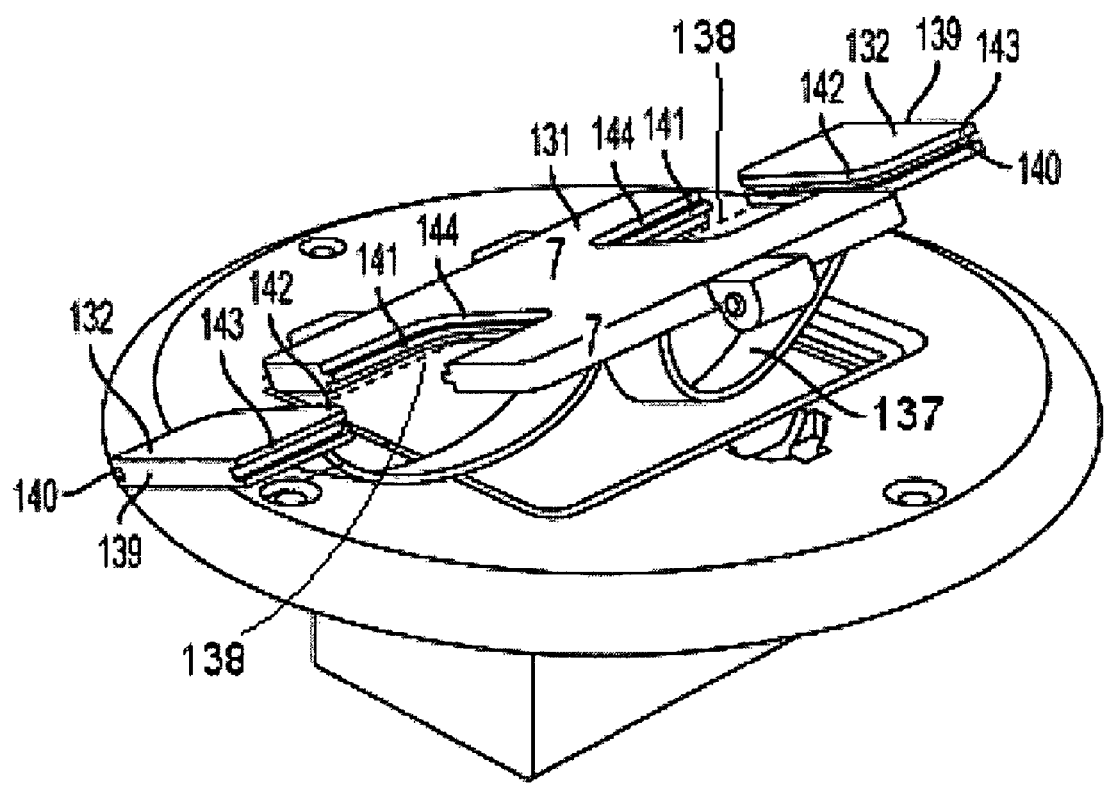
FIG. 6 is a perspective view of a door assembly for an outlet box assembly according to an embodiment of the invention showing details of the door apertures and the tethered sealing gaskets.
Figure 7:
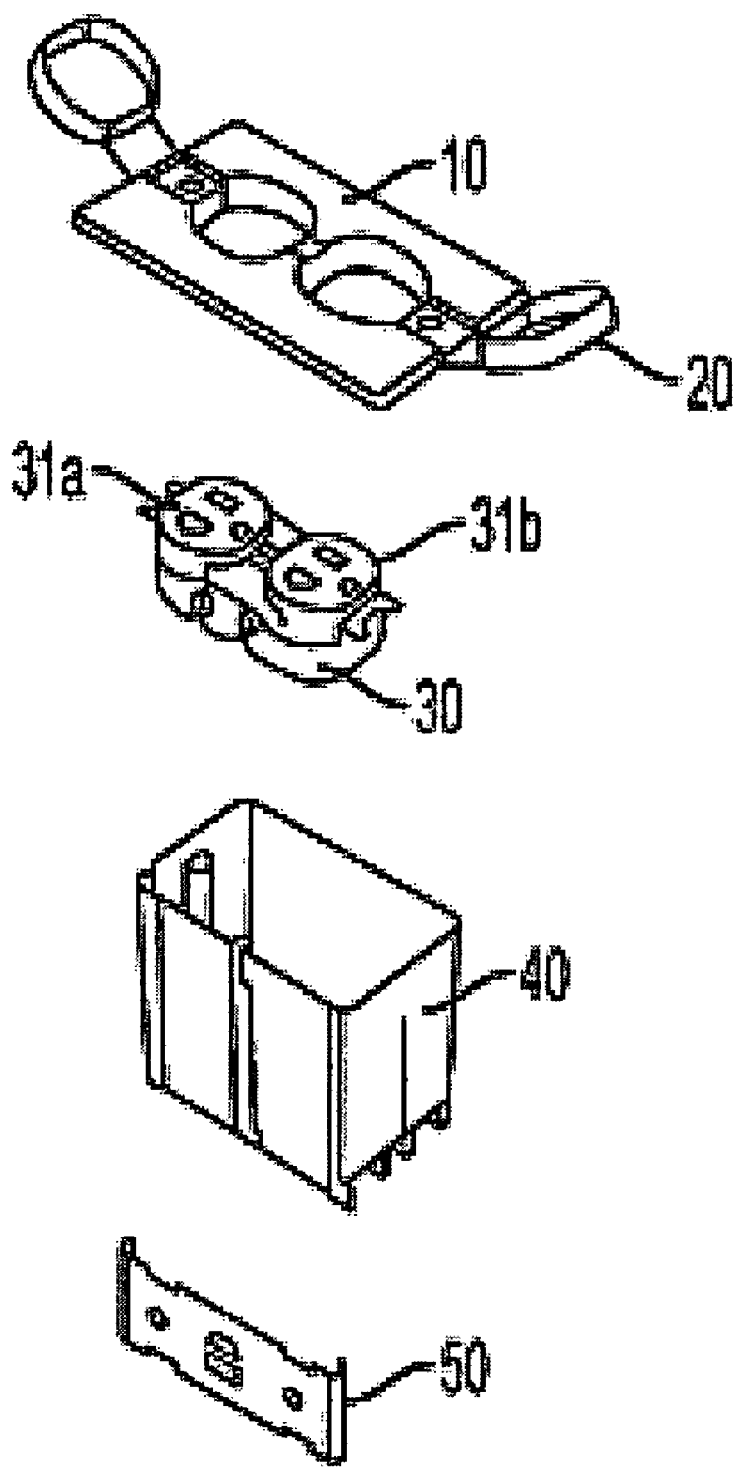
FIG. 7 is an exploded perspective view of conventional outlet box assembly.

FIG. 6 is a detailed illustration of a door panel 131 and the associated tethered gasket seal consistent with the embodiment of the invention described above in connection with FIGS. 3 and 4. In particular, door 131 includes two apertures 138 which are open at respective ends of the door 131. Each aperture 138 is either sealed or opened by the respective placement or removal of gasket members 132. In accordance with the illustrated embodiment in FIG. 6, each gasket member 132 is substantially flat on a backside 139 corresponding to the open end of door 131, and has a groove 140 extending around the remainder of the side surface of the gasket. Apertures 138 include a ledge 141 that corresponds directly with grooves 140 in gasket members 132 and which is slightly wider than the corresponding groove in order to provide a tight seal around the sides of the aperture 138 when the gasket is in place.

The apertures 138 and corresponding gasket members 132 can be of any convenient shape to provide access to the receptacle 136 (FIG. 3) below, however, the exemplary embodiment shown in FIG. 6 illustrates a substantially rectangular aperture/gasket with curved inside corners 142. Curved inside corners 142 provide for increased sealing properties and further provide a 'keying' mechanism so the gasket will not be inserted in the corresponding aperture with an incorrect orientation. Also, according to a further embodiment, the height of the portion 143 of the gasket 132 above the groove 140 is substantially the same dimension as the height of the portion 144 of aperture 138 above ledge 141. Accordingly, when gasket 132 is inserted in aperture 138, the top of gasket 132 is flush with the top surface of door 131, as illustrated in FIG. 4.

While various aspects of the present invention have been particularly shown and described with reference to the exemplary, non-limiting, embodiments above, it will be understood by those skilled in the art that various additional aspects and embodiments may be contemplated without departing from the spirit and scope of the present invention. For example, a skilled artisan would understand that various different types of receptacles can be used in conjunction with the outlet box in accordance with the present invention. More particularly, different grade receptacles such as residential grade, commercial grade and hospital grade receptacles can be used. Furthermore, in addition to electrical power receptacles the invention disclosed herein can also be used with data receptacles as well as hybrid receptacles, such as a Trademark JLOAD Multimedia Outlet, which provides power, Category-5 and coaxial in a single box. Further, a box in accordance with the present invention can also be used with any combination of snap-in modules currently available in the market. Also, additional sealing capabilities can be afforded in accordance with the present invention by means, for example, of a further gasket (not shown) placed between the under side of the plate 130 and the top surface of the flooring material 150 in which the outlet box is installed.

It would be understood that a device or method incorporating any of the additional or alternative details mentioned above would fall within the scope of the present invention as determined based upon the claims below and any equivalents thereof.

Other aspects, objects and advantages of the present invention can be obtained from a study of the drawings, the disclosure and the appended claims.

What is claimed is:

1. An outlet box assembly comprising:
   a housing configured with at least two opposing side portions, two opposing end portions and a base portion;
   at least one adjustment mechanism secured to a top surface of a floor structure with a top flange and in slideable relation with a respective side or end portion of said housing; and
   at least one adjustment device mechanically attached to said housing and at least one a respective adjustment mechanism,
   wherein the respective adjustment plate mechanism moves relative to said housing.

2. The outlet box assembly as claimed in claim 1, wherein said at least one adjustment mechanism includes:
   at least one tab portion operable to receive said adjustment device; and
   a side flange integral with said top flange and operable to secure the adjustment mechanism to a side surface of the floor structure.

3. The outlet box assembly as claimed in claim 1, and further comprising:
   a tapered recessed box with a narrow opening at one end disposed adjacent to an opening in said housing and a wide opening at an opposing end, wherein the wide opening is larger than the narrow opening in at least one dimension; and
   a cover plate mechanically attached to said tapered recessed box and including an aperture corresponding to the wide opening in said tapered recessed box.

4. The outlet box assembly as claimed in claim 3, and further comprising:
   an access door mechanically attached to said cover plate and disposed to selectively cover and expose the aperture in said cover plate.

5. The outlet box assembly as claimed in claim 4, wherein said access door includes at least one aperture for providing access to said tapered recessed box.

6. The outlet box assembly as claimed in claim 5, and further comprising
   at least one gasket for sealing the at least one aperture in said access door.

7. The outlet box assembly as claimed in claim 6, wherein said at least one gasket includes an aperture covering portion having a groove disposed in a side thereof for engaging a corresponding ridge disposed on an edge of the aperture in said access door.

8. The outlet box assembly as claimed in claim 7, wherein said at least one gasket further comprises a tethering strap attached at one end thereof to an underside of said access door and attached at another end thereof to said aperture covering portion, wherein, when said aperture covering portion of said gasket is removed from its respective aperture in said access door, the removed aperture covering portion is retained below said access door within said tapered recessed box.

9. The outlet box assembly as claimed in claim 3, and further comprising
   an electrical receptacle mechanically attached to said housing at an open end thereof opposite the base portion.

10. The outlet box assembly as claimed in claim 1 and further comprising
    at least one pair of retainer guides disposed on an inside surface of said housing and operable to retain a dividing plate disposed within said housing for electrically separating the inside of said housing into respective chambers.

11. The outlet box assembly as claimed in claim 10, and further comprising
    a receptacle mechanically attached to said housing at an open end thereof opposite the base portion, wherein said receptacle comprises a power side for providing electrical power and a low-voltage side for providing a communication signal.

12. An outlet box assembly comprising:
    a housing for an electrical receptacle;
    a cover plate having an aperture;
    a door panel attached to said cover plate operable to cover the aperture in said cover plate, said door panel including at least one aperture smaller in dimension than the aperture in said cover plate, wherein each aperture in said door panel has a lip; and
    at least one sealing gasket respectively corresponding to the at least one aperture in said door panel, wherein each sealing gasket has substantially the same dimensions as its respective aperture in said door panel and each sealing gasket includes a groove that engages the lip in the corresponding aperture of said door panel to create a seal against contaminants.

13. The outlet box assembly as claimed in claim 12, and further comprising
    a tapered sleeve open at two opposing sides and disposed between a top of said housing and a bottom of said cover plate, wherein one open side of said tapered sleeve has the same dimension as the top of said housing and the opposing open side of said tapered sleeve has the same dimension as the aperture in said cover plate.

14. The outlet box assembly as claimed in claim 12, and further comprising
    an adjusting means for maintaining the top of said housing spaced from the bottom of said cover plate by a first distance.

15. The outlet box assembly as claimed in claim 14, wherein
said first predetermined distance is at least one inch.

16. The outlet box assembly as claimed in claim 14, wherein
said adjustment means is slidably connected to said housing and includes an attachment device operable to secure said housing to at least one of the top surface of flooring material into which the housing is installed and floor support structure supporting the flooring material.

17. The outlet box assembly as claimed in claim 14, and further comprising
a non-conductive cover at least partially covering the adjusting means.

18. The outlet box assembly as claimed in claim 12, and further comprising
at least one tethering device, wherein the at least one sealing gasket is attached to the underside of said door panel by said tethering device.

19. The outlet box assembly as claimed in claim 12, and further comprising
a sealing ring disposed around a perimeter of the aperture in said cover plate and creating a tight seal between said door panel and said cover plate when said door panel is closed.

20. The outlet box assembly as claimed in claim 19, wherein
said door panel is hingedly connected to said cover plate on one side of said door panel and a latch is provided on an opposing side of said door panel, wherein the latch retains the door panel tightly against said sealing ring.

21. An outlet box assembly comprising:
a housing for accommodating an electrical receptacle, wherein the housing includes two opposing end portions and at least two respective attachment tabs corresponding to and integral with the end portions,
wherein the attachment tabs each include mounting holes operable to accommodate corresponding mounting holes in the electrical receptacle, and
wherein, each of the end portions of the housing include a notch for accommodating a respective structural component of the electrical receptacle.

22. The outlet box as claimed in claim 21, wherein
the mounting holes in the attachment tabs include holes located such that they align respectively with mounting holes in a multimedia outlet which provides connections for power, Category-5 (Cat-5) and coaxial when the multimedia outlet is mounted to the housing, and the notches in each end portion of the housing correspond to respective structural components of the multimedia outlet when the multimedia outlet is mounted to the housing.

23. The outlet box as claimed in claim 21, wherein
said notches in the end portions of the housing respectively include a rectangular cutout beginning at a top surface of the end portion of the housing adjacent to the attachment tab and is wider in a dimension parallel to the top surface than it is deep in a dimension perpendicular to the top surface.

24. An outlet box cover assembly for covering an electrical outlet box, the assembly comprising:
a tapered recessed box with a narrow opening at one end and a wide opening at an opposing end, wherein the wide opening is larger than the narrow opening in at least one dimension; and
a cover plate mechanically attached to said tapered recessed box and including an aperture corresponding to the wide opening in said tapered recessed box.

25. The outlet box cover assembly as claimed in claim 24, and further comprising
an access door mechanically attached to said cover plate and disposed to selectively cover and expose the aperture in said cover plate.

26. The outlet box cover assembly as claimed in claim 25, wherein
said access door includes at least one aperture for providing access to said tapered recessed box.

27. The outlet box cover assembly as claimed in claim 26, and further comprising
at least one gasket for sealing the at least one aperture in said access door.

28. The outlet box cover assembly as claimed in claim 27, wherein
said at least one gasket includes an aperture covering portion having a groove disposed in a side thereof for engaging a corresponding ridge disposed on an edge of the aperture in said access door.

29. The outlet box cover assembly as claimed in claim 28, wherein
said at least one gasket further includes a tethering strap attached at one end thereof to an underside of said access door and attached at another end thereof to said aperture covering portion, wherein, when said aperture covering portion of said gasket is removed from its respective aperture in said access door, the removed aperture covering portion is retained below said access door within said tapered recessed box.

\* \* \* \* \*